No. 775,297. PATENTED NOV. 22, 1904.
A. A. EWALD
ROTARY MOTOR.
APPLICATION FILED JUNE 2, 1904.
NO MODEL.
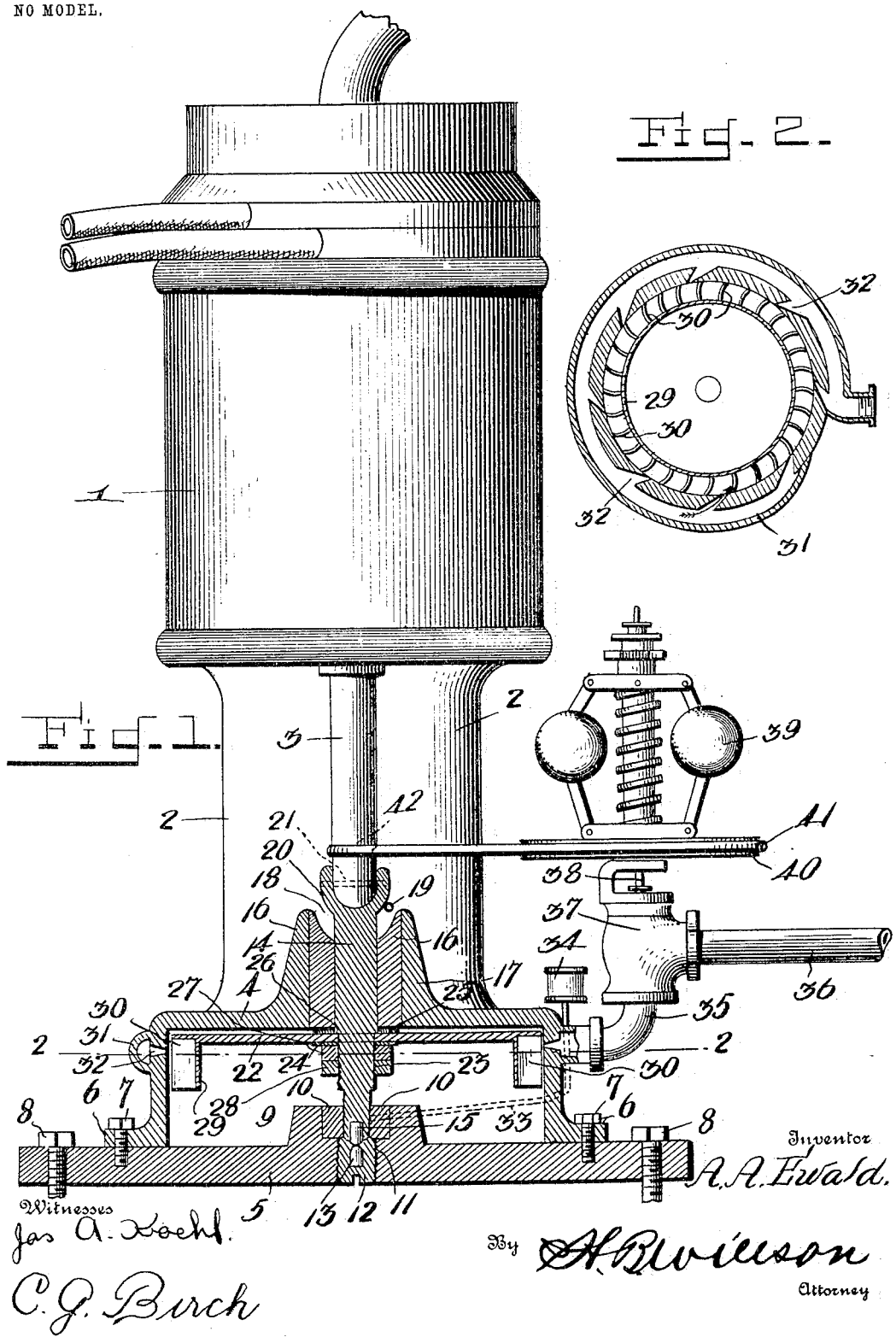
Witnesses
Jas A. Koehl
C. G. Birch
Inventor
A. A. Ewald
By H. R. Wilson
Attorney No. 775,297. Patented November 22, 1904.

UNITED STATES PATENT OFFICE.

ARNO A. EWALD, OF LEROY, WISCONSIN.

ROTARY MOTOR.

SPECIFICATION forming part of Letters Patent No. 775,297, dated November 22, 1904.

Application filed June 2, 1904. Serial No. 210,889. (No model.)

*To all whom it may concern:*

Be it known that I, ARNO A. EWALD, a citizen of the United States, residing at Leroy, in the county of Dodge and State of Wisconsin, have invented certain new and useful Improvements in Rotary Motors; and I do declare the following to be a full, clear, and exact description of the invention, such as will enable others skilled in the art to which it appertains to make and use the same.

This invention relates to rotary motors or turbines.

The object of the invention is to provide a motor of this kind which will yield high power and speed and may be applied for operating separators and other high-speed machinery, which is simple, cheap, and efficient in construction and operation, and which embodies certain improved features of construction and combination of parts, as will be hereinafter more fully described and claimed.

In the accompanying drawings, Figure 1 is a side elevation of a separator embodying my invention, the latter appearing in vertical section; and Fig. 2 is a horizontal section on line 2 2 of Fig. 1.

Referring now more particularly to the drawings, the numeral 1 represents a separator or other element to be driven or operated, 2 the supporting-standards thereof, and 3 the shaft for driving the operating parts of said element.

In accordance with my invention I provide a motor comprising a casing 4, to which the standards 2 are connected in any suitable manner. If desired, said standards may be cast integrally with said casing or mechanically fastened thereto. The casing is closed at its lower end by a base-plate 5, upon which it rests, and is provided with a flange 6 for the passage of screws or other fastenings 7, whereby it may be secured to said base-plate. The plate 5 is also formed with openings for the passage of bolts 8 to secure it to a floor or other suitable foundation.

The plate 5 is provided with a bearing-boss 9, which is bored or chambered to receive bearing-brasses 10, and below this bore or chamber the plate is formed with a socket 11, screw-threaded to receive a plug or bushing 12, carrying a hard-metal pin 13. The metal shaft 14 is journaled at its lower end in the bearing-brasses 10 and is provided with a hardened-metal pin 15, which rotates in contact with the pin 13, thus reducing wear on the turning parts. The upper end of the shaft 14 is journaled in bearing-brasses 16, arranged within an annular bearing-bracket or boss 17, rising from the casing 4, said brasses 16 being formed at their upper ends with concavities to provide an oil-well 18 to lubricate the shaft and bearing, said well being supplied through an oil-conducting pipe 19, leading from a suitable source of supply. The said upper end of the shaft 14 terminates in a yoke 20, which receives the lower end of the shaft 3 and is coupled thereto by a pin 21 passing through said yoke and shaft, whereby motion may be communicated to said shaft 3 to drive the operating parts of the separator or other element to be driven by the motor.

Arranged within the casing 4 is a motor-wheel 22, consisting of a plate or disk provided with a central opening to receive a threaded intermediate portion 23 of the shaft 14, said plate or disk being secured to said shaft by washers 24 and 25, disposed about the shaft above and below said disk and held in clamping engagement against the shoulder 26 on the shaft 14 by means of a securing-nut 27 and check-nut 28. The bolt or disk 22 is provided with a depending portion 29 and a series of vanes or wings 30 secured thereto, said vanes or wings being curved or set at such an angle as to form an impinging surface against which jets of steam may strike to cause the rotation of said wheel.

In order to supply steam or other motive fluid to the vanes, the casing 4 is provided with a surrounding wall 31, forming a steam-supply chest or chamber which is in communication with the interior of the casing through a series of steam-supply ports 32, formed at intervals around and in the vertical wall of said casing. As shown, these steam-supply ports are substantially of conical form, being largest at their outer ends to receive a full supply of steam and thence tapering gradually to the point where they open into the casing to concentrate steam-pressure and to produce a blast which will impinge with great force against the vanes 30 and rotate the wheel 22 at a rapid rate of speed. The ports are further arranged so that the jets of steam will strike the vanes 30 at an angle to force the same by impact in the desired direction. Oil may be supplied to the lower bearing 10 through a pipe 33 leading from an oil-cup 34 on the exterior of the casing 4.

Communicating at one point with the steam-chamber 31 is a steam-inlet 35 in communication with a steam-supply pipe 36 through a valve-casing 37, containing a suitable form of controlling-valve to govern the supply of steam to the motor. The stem 38 of this valve is operatively connected to a suitable construction of centrifugal governor 39, the shaft of which carries a belt wheel or pulley 40, connected by a belt 41 with the lower end of the shaft 3, which is provided with a groove 42 to receive the same, whereby the motion of the shaft 3 will be transferred to the governor, which when the supply is above or below the normal will control the valve in the casing 37 through the stem 38, and thereby reduce or increase the amount of steam being supplied to the annular steam chamber or chest 31.

The operation of the motor will be readily understood from the foregoing description, and it will be seen that a construction is provided which will enable the motor to be driven economically at a high rate of speed and that the motor may be made compact in form, so as to occupy but little space to drive small apparatus, and yet yield a maximum amount of power to enable a very rapid rate of speed to be obtained by the use of a comparatively small quantity of the impelling medium. This result is due in a large measure to the use of the conically-formed feed-ports 32, which concentrate the entering jets of steam and cause the same to be impelled with great force against the vanes or wings 30 of the wheel 32. It will of course be understood that the vanes and ports may be arranged to drive the wheel in either direction and that, if desired, two sets of ports and vanes may be employed, together with suitable means for controlling the supply of steam thereto, so that in practice the motor may be driven by the simple adjustment of one or more controlling-valves.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim, and desire to secure by Letters Patent, is—

In a motor, the combination of a casing having tangentially-arranged conical inlet-ports, a steam-chamber in communication with said ports, a motor-wheel having curved vanes mounted upon a vertical shaft within the casing, the upper end of said shaft being formed with a yoke-shaped bearing to support the shaft to be driven, and the bearing for said vertical shaft having a concaved upper end, substantially as described.

In testimony whereof I have hereunto set my hand in presence of two subscribing witnesses.

ARNO A. EWALD.

Witnesses:
EDWARD T. FOOTE,
W. E. BRISTOL.